United States Patent
Messick et al.

(10) Patent No.: US 12,550,286 B2
(45) Date of Patent: Feb. 10, 2026

(54) SYSTEMS AND METHODS FOR EQUIPMENT PLACEMENT AND CONFIGURATION IN A SERVER RACK

(71) Applicant: Dell Products L.P., Round Rock, TX (US)

(72) Inventors: Douglas E. Messick, Austin, TX (US); Kyle E. Cross, Austin, TX (US); Binay A. Kuruvila, Cedar Park, TX (US); Thomas Foxworth Archer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 85 days.

(21) Appl. No.: 18/422,025

(22) Filed: Jan. 25, 2024

(65) Prior Publication Data
US 2025/0247993 A1    Jul. 31, 2025

(51) Int. Cl.
| | |
|---|---|
| *H05K 7/14* | (2006.01) |
| *G06F 1/18* | (2006.01) |
| *G06F 1/28* | (2006.01) |
| *G06F 1/3206* | (2019.01) |

(52) U.S. Cl.
CPC ........... *H05K 7/1498* (2013.01); *G06F 1/189* (2013.01); *H05K 7/14325* (2022.08); *H05K 7/14327* (2022.08); *H05K 7/14329* (2022.08); *H05K 7/1492* (2013.01); *G06F 1/28* (2013.01); *G06F 1/3206* (2013.01)

(58) Field of Classification Search
CPC .. G06Q 50/06; H05K 7/1498; H05K 7/14329; H05K 7/14327; H05K 7/14325; H05K 7/1492; G06F 1/189; G06F 1/28; G06F 1/3206
See application file for complete search history.

(56) References Cited

U.S. PATENT DOCUMENTS

| | | | | |
|---|---|---|---|---|
| 10,433,035 | B2 * | 10/2019 | Chayat | H04Q 9/00 |
| 11,388,835 | B1 * | 7/2022 | Bryan | H05K 7/1498 |
| 2016/0282823 | A1 * | 9/2016 | Wang | G06Q 50/06 |

* cited by examiner

*Primary Examiner* — Terrell S Johnson
(74) *Attorney, Agent, or Firm* — Fogarty LLP

(57) ABSTRACT

Systems and methods for equipment placement and configuration in a server rack are described. In an illustrative, non-limiting embodiment, an Information Handling System (IHS) may include: a processor; and a memory coupled to the processor, where the memory includes program instructions stored thereon that, upon execution by the processor, cause the IHS to: obtain power telemetry from a plurality of nodes of a server rack; obtain power source telemetry from one or more power sources of the server rack; determine, based at least in part on the power telemetry and the power source telemetry, a placement or configuration for at least some of the nodes or power sources of the server rack.

20 Claims, 3 Drawing Sheets

SYSTEMS AND METHODS FOR EQUIPMENT PLACEMENT AND CONFIGURATION IN A SERVER RACK

FIELD

This disclosure relates generally to Information Handling Systems (IHSs), and more specifically, to systems and methods for equipment placement and configuration in a server rack.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

Groups of IHSs can be housed in server racks of data centers. A data center is a building, a dedicated space within a building, or a group of buildings used to house computer systems and associated components, such as telecommunications and storage systems. Since IT operations are crucial for business continuity, it generally includes redundant or backup components and infrastructure for power supply, data communication connections, environmental controls (e.g., air conditioning, fire suppression), and various security devices. A large data center is an industrial-scale operation using as much electricity as a small town. A server rack, or simply "rack", is a frame or enclosure, with one or more dimensions typically standardized, for mounting multiple electronic equipment modules. Each module has a front panel that typically has a standardized width, which sometimes is 19 inches wide, for example. The standardized width (e.g., 19-inches) dimension can include the edges or ears that protrude from each side of the equipment, allowing the module to be fastened to the rack frame with screws or bolts. Common uses include computer servers, telecommunications equipment and networking hardware, audiovisual production gear, music production equipment, and scientific equipment.

Equipment designed to be placed in a rack is typically described as rack-mount, rack-mount instrument, a rack-mounted system, a rack-mount chassis, subrack, rack cabinet, rack-mountable, or occasionally simply shelf. Each rack-mountable equipment module has a front panel that is typically a standardized width, (e.g., 19 inches wide). The standardized width can include the edges or ears that protrude from each side of the equipment, allowing the module to be fastened to the rack frame with screws or bolts. The height of the electronic modules is also typically standardized as multiples of 1.75 inches, which is one rack unit ("RU" or more typically just "U"). The industry-standard rack cabinet is 42 RU tall, however, 45 RU racks are also common.

Racks (e.g., nineteen-inch racks) in two-post or four-post form hold most equipment in modern data centers, ISP facilities, and professionally designed corporate server rooms. They allow for dense hardware configurations without occupying excessive floor space or requiring shelving. Racks can also be used to house professional audio and video equipment, including amplifiers, effects units, interfaces, headphone amplifiers, and even small-scale audio mixers. A third common use for rack-mounted equipment is industrial power, control, and automation hardware.

Rack-mountable equipment can be mounted by bolting or clipping its front panel to the server rack. Within the IT industry, it is common for network/communications equipment to have multiple mounting positions, including table-top and wall mounting, so rack-mountable equipment will often feature L-brackets that must be screwed or bolted to the equipment prior to mounting in a server rack, such as for example, a 19-inch rack.

SUMMARY

Systems and methods for equipment placement and configuration in a server rack are described. In an illustrative, non-limiting embodiment, an Information Handling System (IHS) may include: a processor; and a memory coupled to the processor, where the memory includes program instructions stored thereon that, upon execution by the processor, cause the IHS to: obtain power telemetry from a plurality of nodes of a server rack; obtain power source telemetry from one or more power sources of the server rack; determine, based at least in part on the power telemetry and the power source telemetry, a placement or configuration for at least some of the nodes or power sources of the server rack.

In some embodiments, the program instructions further cause the IHS to: provide the placement or configuration determination to a user, administrator, or owner of the server rack. In some embodiments, the server rack includes a plurality of slots and a busbar, where the program instructions further cause the IHS to: obtain physical locations from the plurality of nodes and the one or more power sources of the server rack; determine, based at least in part on the physical locations, the power telemetry, and the power source telemetry, a current density of the busbar across each of the plurality of slots of the server rack; and where to determine the placement or configuration for the at least some of the nodes or power sources, the program instructions further cause the IHS to: determine, based at least in part on the current density of the busbar, the placement or configuration for the at least some of the nodes or power sources of the server rack.

In some embodiments, the server rack includes a plurality of slots, where to determine the placement or configuration for the at least some of the nodes or power sources, the program instructions further cause the IHS to: determine, for individual slots of the plurality of slots of the server rack, the placement of the at least some of the nodes and the power sources within the individual slots. In some embodiments, the server rack includes a busbar, where to determine the placement of the at least some of the nodes and the power sources within the individual slots, the program instructions further cause the IHS to: determine a maximum current density of the busbar across at least some of the individual slots of the server rack; and determine the placement of the at least some of the nodes and the power sources within the individual slots to minimize the maximum busbar current density.

In some embodiments, the server rack includes a busbar, where to determine the placement or configuration for the at least some of the nodes or power sources, the program instructions further cause the IHS to: determine a current density of the busbar; determine that the current density of the busbar exceeds a threshold; and identify alternative busbars for the server rack. In some embodiments, to determine the placement or configuration for the at least some of the nodes or power sources, the program instructions further cause the IHS to: determine that a current limit of a power source is exceeded; and identify alternative power sources for the server rack. In some embodiments, to determine the placement or configuration for the at least some of the nodes or power sources, the program instructions further cause the IHS to: determine, based at least in part on the power source telemetry, that additional power is available in the server rack; and responsive to the determination that additional power is available, identify one or more upgrades to one or more nodes of the server rack.

In some embodiments, the power telemetry includes at least one of: power inventory of the plurality of nodes, power consumption of the plurality of nodes, turbo power of the plurality of nodes, thermal design power of the plurality of nodes, a power inventory lower boundary of the plurality of nodes, or physical locations of the plurality of nodes. In some embodiments, the placement or configuration for the at least some of the nodes or power sources of the server rack is determined by a machine learning model. In some embodiments, the power source telemetry includes at least one of: power capacity of the one or more power sources, power capability of the one or more power sources, power inventory of the one or more power sources, or one or more physical locations of the one or more power sources. In some embodiments, the power telemetry and the power source telemetry is obtained via a network.

In some embodiments, the one or more power sources include one or more power shelves, where each of the one or more power shelves includes one or more power supplies. In some embodiments, the one or more power shelves include one or more disaggregated power shelves.

In another illustrative, non-limiting embodiment, a method includes: obtaining power telemetry from a plurality of nodes of a server rack; obtaining power source telemetry from one or more power sources of the server rack; determining, based at least in part on the power telemetry and the power source telemetry, a placement or configuration for at least some of the nodes or power sources of the server rack.

In some embodiments, the method further includes: providing the placement or configuration determination to a user, administrator, or owner of the server rack. In some embodiments, the server rack includes a plurality of slots and a busbar, and the method further includes: obtaining physical locations from the plurality of nodes and the one or more power sources of the server rack; determining, based at least in part on the physical locations, the power telemetry, and the power source telemetry, a current density of the busbar across each of the plurality of slots of the server rack; and where determining the placement or configuration for the at least some of the nodes or power sources further includes: determining, based at least in part on the current density of the busbar, the placement or configuration for the at least some of the nodes or power sources of the server rack.

In some embodiments, the server rack includes a plurality of slots and a busbar, where determining the placement or configuration for the at least some of the nodes or power sources further includes: determining, based at least in part on the power source telemetry, a maximum current density of the busbar across at least some of the plurality of slots of the server rack; and determining, for individual slots of the plurality of slots of the server rack, the placement of the at least some of the nodes and the power sources within the individual slots that minimizes the maximum busbar current density.

In another illustrative, non-limiting embodiment, one or more non-transitory computer-readable storage media store program instructions that when executed on or across one or more processors of an Information Handling System (IHS), cause the one or more processors to: obtain power telemetry from a plurality of nodes of a server rack; obtain power source telemetry from one or more power sources of the server rack; determine, based at least in part on the power telemetry and the power source telemetry, a placement or configuration for at least some of the nodes or power sources of the server rack.

In some embodiments, the server rack includes a plurality of slots and a busbar, where the program instructions further cause the one or more processors to: obtain physical locations from the plurality of nodes and the one or more power sources of the server rack; determine, based at least in part on the physical locations, the power telemetry, and the power source telemetry, a current density of the busbar across each of the plurality of slots of the server rack; and wherein to determine the placement or configuration for the at least some of the nodes or power sources, the program instructions further cause the one or more processors to: determine, based at least in part on the current density of the busbar, the placement or configuration for the at least some of the nodes or power sources of the server rack.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may consist of various combinations of a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include components such as Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
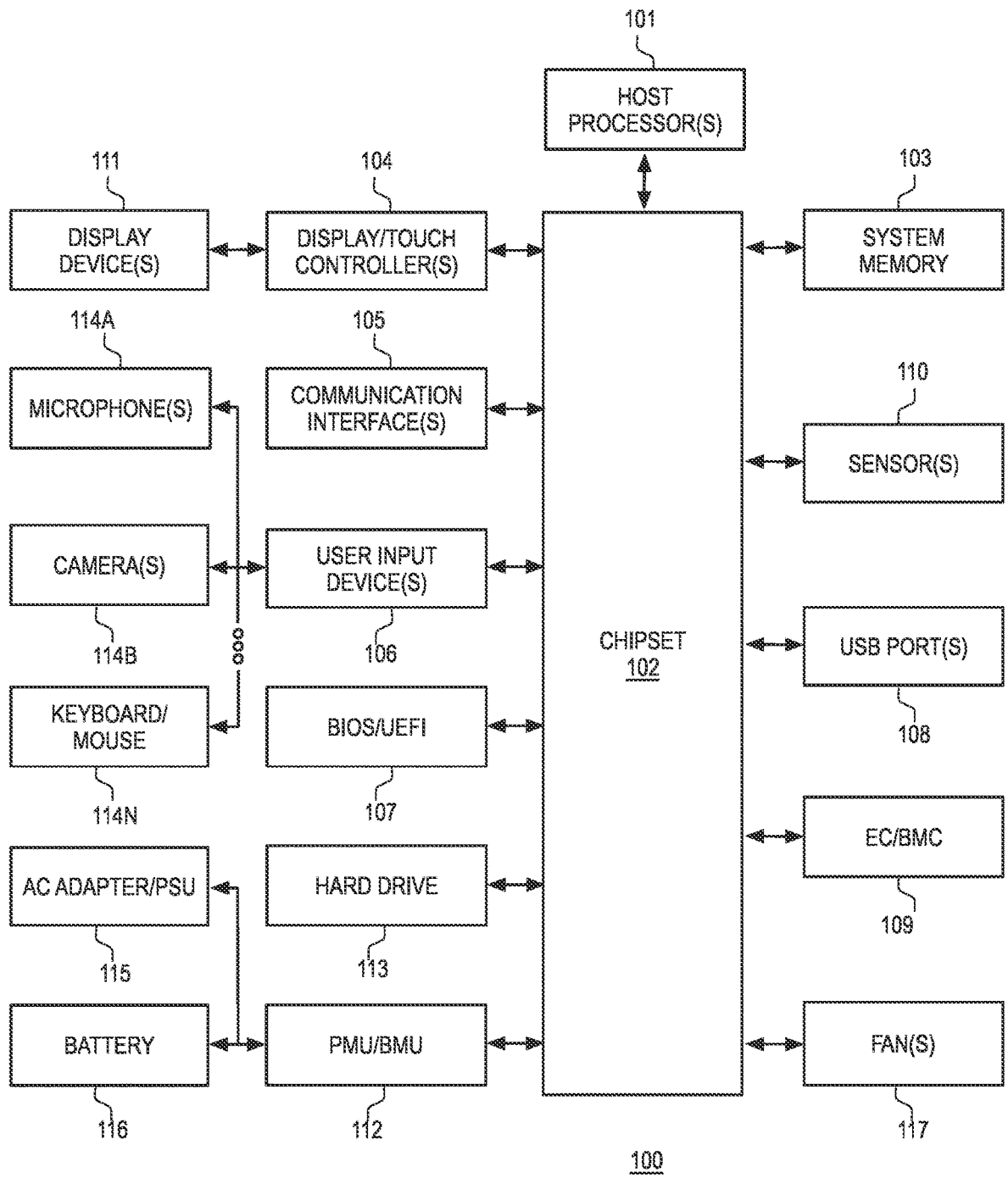
FIG. 1 is a diagram illustrating examples of hardware components of an Information Handling System (IHS), according to some embodiments.

FIG. 1 is a block diagram of hardware components of IHS 100, which may be used to implement systems and methods for equipment placement and configuration in a server rack.

As depicted, IHS 100 includes host processor(s) 101. In various embodiments, IHS 100 may be a single-processor system, or a multi-processor system including two or more processors. Host processor(s) 101 may include any processor capable of executing program instructions, such as a PENTIUM processor, or any general-purpose or embedded processor implementing any of a variety of Instruction Set Architectures (ISAs), such as an x86 or a Reduced Instruction Set Computer (RISC) ISA (e.g., POWERPC, ARM, SPARC, MIPS, etc.). In some embodiments, the host processor(s) 101 can include memory built into the host processor(s) from which, for example, program instructions can be executed.

IHS 100 includes chipset 102 coupled to host processor(s) 101. Chipset 102 may provide host processor(s) 101 with access to several resources. In some cases, chipset 102 may utilize a QuickPath Interconnect (QPI) bus to communicate with host processor(s) 101.

Chipset 102 may also be coupled to communication interface(s) 105 to enable communications between IHS 100 and various wired and/or wireless networks, such as Ethernet, WiFi, BLUETOOTH (BT), cellular or mobile networks (e.g., Code-Division Multiple Access or "CDMA," Time-Division Multiple Access or "TDMA," Long-Term Evolution or "LTE," etc.), satellite networks, or the like. Communication interface(s) 105 may also be used to communicate with certain peripherals devices (e.g., BT speakers, microphones, headsets, etc.). Moreover, communication interface(s) 105 may be coupled to chipset 102 via a Peripheral Component Interconnect Express (PCIe) bus, or the like.

Chipset 102 may be coupled to display/touch controller(s) 104, which may include one or more or Graphics Processor Units (GPUs) on a graphics bus, such as an Accelerated Graphics Port (AGP) or PCIe bus. As shown, display/touch controller(s) 104 provide video or display signals to one or more display device(s) 111.

Display device(s) 111 may include Liquid Crystal Display (LCD), Light Emitting Diode (LED), organic LED (OLED), or other thin film display technologies. Display device(s) 111 may include a plurality of pixels arranged in a matrix, configured to display visual information, such as text, two-dimensional images, video, three-dimensional images, etc. In some cases, display device(s) 111 may be provided as a single continuous display, or as two or more discrete displays.

Chipset 102 may provide host processor(s) 101 and/or display/touch controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a solid-state drive (SSD) or the like.

Chipset 102 may also provide host processor(s) 101 with access to one or more Universal Serial Bus (USB) ports 108, to which one or more peripheral devices may be coupled (e.g., integrated or external webcams, microphones, speakers, etc.).

Chipset 102 may further provide host processor(s) 101 with access to one or more hard disk drives, solid-state drives, optical drives, or other removable-media drives 113.

Chipset 102 may also provide access to one or more user input devices 106, for example, using a super I/O controller or the like. Examples of user input devices 106 include, but are not limited to, microphone(s) 114A, camera(s) 114B, and keyboard/mouse 114N. Other user input devices 106 may include a touchpad, stylus or active pen, totem, etc.

Each of user input devices 106 may include a respective controller (e.g., a touchpad may have its own touchpad controller) that interfaces with chipset 102 through a wired or wireless connection (e.g., via communication interfaces(s) 105). In some cases, chipset 102 may also provide access to one or more user output devices (e.g., video projectors, paper printers, 3D printers, loudspeakers, audio headsets, Virtual/Augmented Reality (VR/AR) devices, etc.)

In certain embodiments, chipset 102 may further provide an interface for communications with hardware sensors 110.

Sensors 110 may be disposed on or within the chassis of IHS 100, or otherwise coupled to IHS 100, and may include, but are not limited to: electric, magnetic, radio, optical (e.g., camera, webcam, etc.), infrared, thermal (e.g., thermistors etc.), force, pressure, acoustic (e.g., microphone), ultrasonic, proximity, position, deformation, bending, direction, movement, velocity, rotation, gyroscope, Inertial Measurement Unit (IMU), and/or acceleration sensor(s).

Upon booting of IHS 100, host processor(s) 101 may utilize program instructions of Basic Input/Output System (BIOS) 107 to initialize and test hardware components coupled to IHS 100 and to load host OS 400 (FIG. 4) for use by IHS 100. BIOS 107 provides an abstraction layer that allows host OS 400 to interface with certain IHS components 100. Relying upon the hardware abstraction layer provided by BIOS 107, software stored in system memory 103 and executed by host processor(s) 101 can interface with certain I/O devices that are coupled to IHS 100.

The Unified Extensible Firmware Interface (UEFI) was designed as a successor to BIOS. As a result, many modern IHSs utilize UEFI in addition to or instead of a BIOS. As used herein, BIOS 107 is intended to also encompass a UEFI component.

Embedded Controller (EC) or Baseboard Management Controller (BMC) 109 is operational from the very start of each IHS power reset and handles various tasks not ordinarily handled by host processor(s) 101. Examples of these operations may include, but are not limited to: receiving and processing signals from a keyboard or touchpad, as well as other buttons and switches (e.g., power button, laptop lid switch, etc.), receiving and processing thermal measurements (e.g., performing fan control, CPU and GPU throttling, and emergency shutdown), controlling indicator LEDs (e.g., caps lock, scroll lock, num lock, battery, ac, power, wireless LAN, sleep, etc.), managing PMU/BMU 112, alternating current (AC) adapter/Power Supply Unit (PSU) 115 and/or battery 116, allowing remote diagnostics and remediation over network(s) 103, etc.

For example, EC/BMC 109 may implement operations for interfacing with power adapter/PSU 115 in managing power for IHS 100. Such operations may be performed to determine the power status of IHS 100, such as whether IHS 100 is operating from AC adapter/PSU 115 and/or battery 116. A non-limiting example of a BMC 109 is the integrated Dell Remote Access Controller (iDRAC) from Dell, Inc.®.

Firmware instructions utilized by EC/BMC 109 may also be used to provide various core operations of IHS 100, such as power management and management of certain modes of IHS 100 (e.g., turbo modes, maximum operating clock frequencies of certain components, etc.).

In addition, EC/BMC 109 may implement operations for detecting certain changes to the physical configuration or posture of IHS 100. For instance, when IHS 100 as a 2-in-1 laptop/tablet form factor, EC/BMC 109 may receive inputs from a lid position or hinge angle sensor 110, and it may use those inputs to determine: whether the two sides of IHS 100 have been latched together to a closed position or a tablet position, the magnitude of a hinge or lid angle, etc. In response to these changes, the EC may enable or disable certain features of IHS 100 (e.g., front or rear facing camera, etc.).

In some cases, EC/BMC 109 may be configured to identify any number of IHS postures, including, but not limited to: laptop, stand, tablet, tent, or book. For example, when display(s) 111 of IHS 100 is open with respect to a horizontal keyboard portion, and the keyboard is facing up, EC/BMC 109 may determine IHS 100 to be in a laptop posture. When display(s) 111 of IHS 100 is open with respect to the horizontal keyboard portion, but the keyboard is facing down (e.g., its keys are against the top surface of a table), EC/BMC 109 may determine IHS 100 to be in a stand posture.

When the back of display(s) 111 is closed against the back of the keyboard portion, EC/BMC 109 may determine IHS 100 to be in a tablet posture. When IHS 100 has two display(s) 111 open side-by-side, EC/BMC 109 may determine IHS 100 to be in a book posture. When IHS 100 has two displays open to form a triangular structure sitting on a horizontal surface, such that a hinge between the displays is at the top vertex of the triangle, EC/BMC 109 may determine IHS 100 to be in a tent posture. In some implementations, EC/BMC 109 may also determine if display(s) 111 of IHS 100 are in a landscape or portrait orientation.

In some cases, EC/BMC 109 may be installed as a Trusted Execution Environment (TEE) component to the motherboard of IHS 100.

Additionally, or alternatively, EC/BMC 109 may be configured to calculate hashes or signatures that uniquely identify individual components of IHS 100. In such scenarios, EC/BMC 109 may calculate a hash value based on the configuration of a hardware and/or software component coupled to IHS 100. For instance, EC/BMC 109 may calculate a hash value based on all firmware and other code or settings stored in an onboard memory of a hardware component.

Hash values may be calculated as part of a trusted process of manufacturing IHS 100 and may be maintained in secure storage as a reference signature. EC/BMC 109 may later recalculate the hash value for a component may compare it against the reference hash value to determine if any modifications have been made to the component, thus indicating that the component has been compromised. In this manner, EC/BMC 109 may validate the integrity of hardware and software components installed in IHS 100.

In various embodiments, IHS 100 may be coupled to an external power source (e.g., AC outlet or mains) through AC adapter/PSU 115. AC adapter/PSU 115 may include an adapter portion having a central unit (e.g., a power brick, wall charger, or the like) configured to draw power from an AC outlet via a first electrical cord, convert the AC power to direct current (DC) power, and provide DC power to IHS 100 via a second electrical cord.

Additionally, or alternatively, AC adapter/PSU 115 may include an internal or external power supply portion (e.g., a switching power supply, etc.) connected to the second electrical cord and configured to convert AC to DC. AC adapter/PSU 115 may also supply a standby voltage, so that most of IHS 100 can be powered off after preparing for hibernation or shutdown, and powered back on by an event (e.g., remotely via wake-on-LAN, etc.). In general, AC adapter/PSU 115 may have any specific power rating, measured in volts or watts, and any suitable connectors.

IHS 100 may also include internal or external battery 116. Battery 116 may include, for example, a Lithium-ion or Li-ion rechargeable device capable of storing energy sufficient to power IHS 100 for an amount of time, depending upon the IHS's workloads, environmental conditions, etc. In some cases, a battery pack may also contain temperature sensors, voltage regulator circuits, voltage taps, and/or charge-state monitors.

Power Management Unit (PMU) 112 governs power functions of IHS 100, including AC adapter/PSU 115 and battery 116. For example, PMU 112 may be configured to: monitor power connections and battery charges, charge battery 116, control power to other components, devices, or ICs, shut down components when they are left idle, control sleep and power functions ("on" and "off"), manage interfaces for built-in keypad and touchpads, regulate real-time clocks (RTCs), etc.

In some implementations, PMU 112 may include one or more Power Management Integrated Circuits (PMICs) configured to control the flow and direction or electrical power in IHS 100. Particularly, a PMIC may be configured to perform battery management, power source selection, voltage regulation, voltage supervision, undervoltage protection, power sequencing, and/or charging operations. It may also include a DC-to-DC converter to allow dynamic voltage scaling, or the like.

Additionally, or alternatively, PMU 112 may include a Battery Management Unit (BMU) (referred to collectively as "PMU/BMU 112"). AC adapter/PSU 115 may be removably coupled to a battery charge controller within PMU/BMU 112 to provide IHS 100 with a source of DC power from battery cells within battery 116 (e.g., a lithium ion (Li-ion) or nickel metal hydride (NiMH) battery pack including one or more rechargeable batteries). PMU/BMU 112 may include non-volatile memory and it may be configured to collect and store battery status, charging, and discharging information, and to provide that information to other IHS components.

Examples of information collected and stored in a memory within PMU/BMU 112 may include, but are not limited to: operating conditions (e.g., battery operating conditions including battery state information such as battery current amplitude and/or current direction, battery voltage, battery charge cycles, battery state of charge, battery state of health, battery temperature, battery usage data such as charging and discharging data; and/or IHS operating conditions such as processor operating speed data, system power management and cooling system settings, state of "system present" pin signal), environmental or contextual information (e.g., such as ambient temperature, relative humidity, system geolocation measured by GPS or triangulation, time and date, etc.), and BMU events.

Examples of BMU events may include, but are not limited to: acceleration or shock events, system transportation events, exposure to elevated temperature for extended time periods, high discharge current rate, combinations of battery voltage, battery current and/or battery temperature (e.g., elevated temperature event at full charge and/or high voltage causes more battery degradation than lower voltage), etc.

In some embodiments, power draw measurements may be conducted with control and monitoring of power supply via PMU/BMU 112. Power draw data may also be monitored with respect to individual components or devices of IHS 100. Whenever applicable, PMU/BMU 112 may administer the execution of a power policy, or the like.

IHS 100 may also include one or more fans 117 configured to cool down one or more components or devices of IHS 100 disposed inside a chassis, case, or housing. Fan(s) 117 may include any fan inside, or attached to, IHS 100 and used for active cooling. Fan(s) 117 may be used to draw cooler air into the case from the outside, expel warm air from inside, and/or move air across a heat sink to cool a particular IHS component. In various embodiments, both axial and sometimes centrifugal (blower/squirrel-cage) fans may be used.

In other embodiments, IHS 100 may not include all the components shown in FIG. 1. In other embodiments, IHS 100 may include other components in addition to those that are shown in FIG. 1. For example, IHS 100 may include security processors (e.g., Trusted Platform Module (TPM)), GPUs, and/or AI accelerators.

Furthermore, some components that are represented as separate components in FIG. 1 may instead be integrated with other components, such that all or a portion of the operations executed by the illustrated components may instead be executed by the integrated component.

For example, in various embodiments described herein, host processor(s) 101 and/or other components of IHS 100 (e.g., chipset 102, display/touch controller(s) 104, communication interface(s) 105, EC/BMC 109, etc.) may be replaced by discrete devices within a heterogenous computing platform (e.g., a System-On-Chip or "SoC"). As such, IHS 100 may assume different form factors including, but not limited to: servers, workstations, desktops, laptops, appliances, video game consoles, tablets, smartphones, etc.

Typically, an IHS, such as a server, is going to have AC power coming into its power supplies. With servers, there's usually more than one power supply. With a normal runtime, everything's healthy and a server is within its power bounds. A server is loaded and is consuming the power. With a failure scenario, a power supply might go down and so the power source is reduced, or something on the server is overheating, and the power consumption of the device needs to be reduced. Therefore, sometimes power to devices needs to be controlled because of external power delivery issues. Power of the device needs to be controlled because of internal reasons, independent of the power capability that is being supplied.

Typically, an EC/BMC can perform the power control. For example, EC/BMC 109 may implement operations for interfacing with power adapter/PSU 115 in managing power for IHS 100. In a server rack environment, the EC/BMC in each node manages the PSUs and implements redundancy and power control behaviors to respond to PSU failures and implement PSU hardware protection. As an example, if a server rack contained 50 servers, and each server had two power supplies, then there would be 100 power supplies inside each of the racks, with the EC/BMC of each of the servers monitoring their own two power supplies. If one of the power supplies in a traditional server is lost, then the EC/BMC needs to control power so that the limits of that one power supply are not exceeded.

However, a new paradigm called disaggregated power involves power supplies that are external to the server. With rack-level implementations, disaggregated power removes the power supplies (e.g., PSUs) from the nodes, and instead places multiple PSUs into a device called a power shelf. A power shelf is a group of power supplies, along with possibly other components, in an enclosure of a rack shelf. Disaggregated power can mean that at least the AC to DC part of the power supplies is removed, from inside the server, to the rack, in some embodiments. Multiple power shelves of a rack can deliver power to a rack of nodes via a bus bar (e.g., 51V bus bar).

In some embodiments the rack is an Open Rack version 3 (Orv3). Open Rack is an Open Compute Project standard for a rack and power delivery architecture and an efficient, scalable alternative to the traditional racks. Open Rack rack units are called OpenU or just "OU." In addition, in some embodiments, the power shelves can be 18 kW, and the power shelves can provide 51V DC power to the rack of nodes via a busbar integrated into the rack. Current can flow from multiple power shelves into the busbar and to the numerous devices connected to the busbar With disaggregated power, the EC/BMC cannot talk to those power supplies anymore because the power supplies are per-rack, or at the rack level. For example, with disaggregated power, there can be 6 power supplies per power shelf. A power shelf can take in the AC input and output DC voltage across the bus bar, which can be around the back of the rack. In some embodiments, the bus bar can be 51 volts. When the compute servers plug into such a rack, they're going to input those 51 volts being generated by all the power supplies, that the compute servers themselves don't care about anymore from a traditional perspective. With disaggregated power, the capability to control power by an individual server is removed. However, there is still value in knowing what power is available, what servers are healthy, and what the power limits are in a rack level environment, instead of at the internal server level.

Unfortunately, with such rack-level disaggregated power, customers, clients, users, administrators, or owners do not know where to put power shelves, and the optimal location to place power shelves in a rack with disaggregated power is not intuitive. When populating a ORv3 busbar equipped rack, for example, the location of disaggregated power sources and IT equipment can exceed busbar current density limits. Devices populated in a busbar equipped rack may be placed in such a manner that requires a larger or higher capability busbar or power shelf than would otherwise be needed if the rack was populated in a current density optimized manner. There does not exist a feature in the rack scale-out space that enables right-sizing and/or placement of the disaggregated power infrastructure.

Some embodiments of the systems and methods for equipment placement and configuration in a server rack solves these and other problems by providing a method for power shelf and IT equipment placement in a bus bar equipped rack that is optimized for current density. Such a method, in some embodiments, can right-size the power shelves, right-size the busbar, and provide guidance to populate a rack in order to distribute current across a bus bar. In some embodiments, an application can process inputs such as devices in a rack and produce outputs such as current density across the busbar. In some embodiment, such an application can be a model driven tool supporting a large number of products and configurations for infrastructure sizing purposes. In some embodiments the application or model can be based on hardware measurements with operating conditions representative of typical use cases. The inputs and outputs can be utilized to provide higher-level configuration guidance to a client or customer, or a user, administrator, or owner of the server rack.

Figure 2:
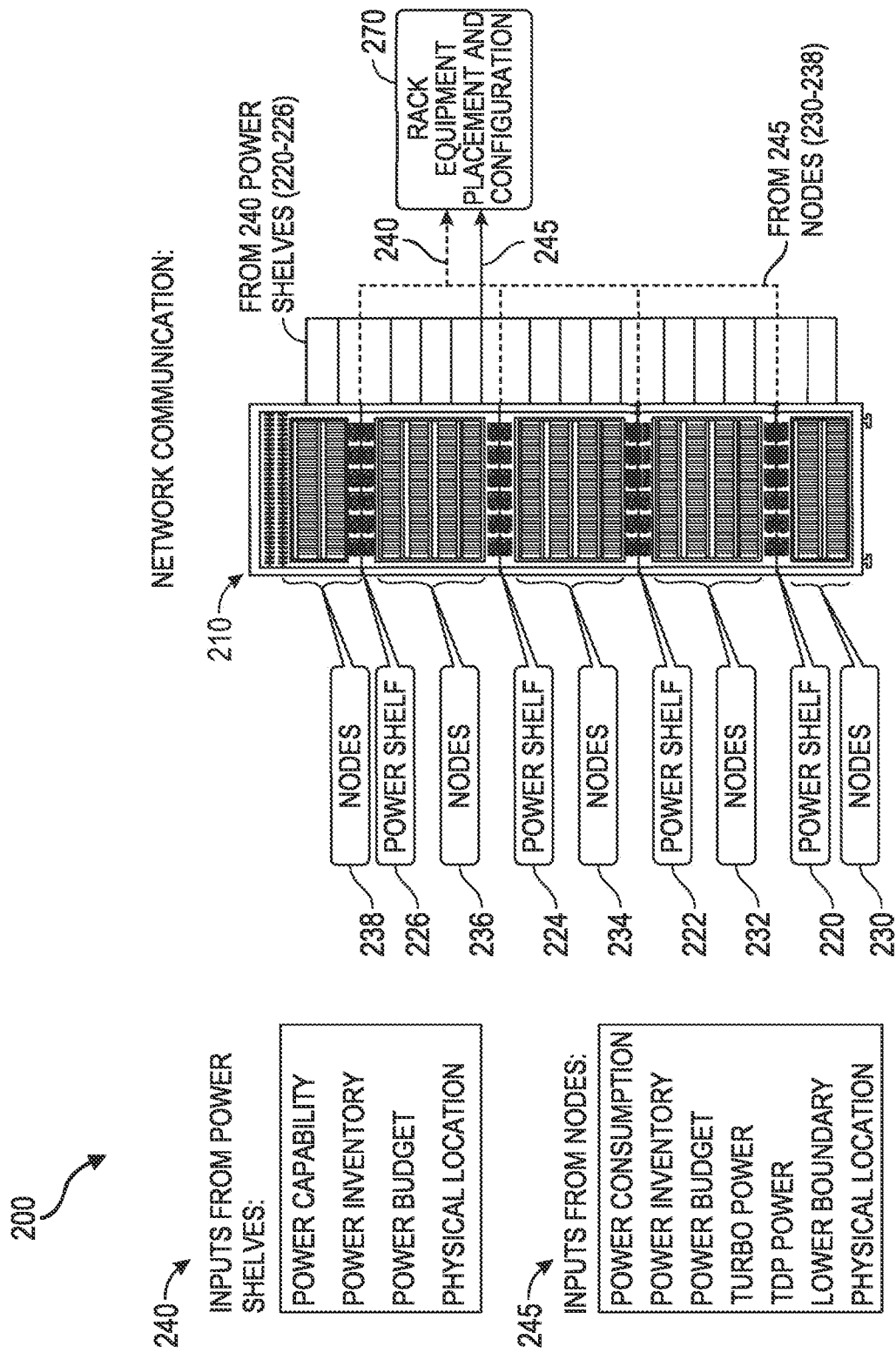
FIG. 2 depicts a server rack with nodes and power shelves for equipment placement and configuration in a server rack, while further depicting inputs from and outputs to the nodes and power shelves, according to some embodiments

FIG. 2 depicts a system 200 server rack 210 with nodes (230, 232, 234, 236, 238) and power shelves (220, 222, 224, 226) for equipment placement and configuration in a server rack, while further depicting inputs (240, 245) from the nodes and power shelves, according to some embodiments. The server rack 210 also includes a 51V bus bar (not shown) and runs vertically up and down the back-side of the rack 210. In some embodiments there is one bus bar, and in other embodiments there are multiple bus bars per rack. FIG. 2 also illustrates a rack equipment placement and configuration component 270. The equipment placement and configuration component 270 receives telemetry via a network and issues equipment placement and configuration recommendations.

The equipment placement and configuration 270 can be integrated as a feature set into a component, application, console, container, plugin, service, or set of micro-services, for a one-to-many management suite, in some embodiments. In some embodiments the feature set can implement power and control behaviors across a rack of nodes with disaggregated power via a closed loop algorithm and network-based telemetry.

The rack equipment placement and configuration 270 can acquire the average power capabilities of the power shelves (220, 222, 224, 226) and nodes (230, 232, 234, 236, 238), collect power telemetry, and provide rack equipment placement and configuration recommendations. Such a design can implement rack scale-out disaggregated power control and behaviors to enable right-sizing of the power infrastructure.

In some embodiments, the power shelves (220, 222, 224, 226) can include a power shelf management controller ("PMC"). A PMC operates like the BMC of a node. A PMC allows an outside entity to communicate with the power shelf. A PMC can obtain and transmit telemetry. PMC can turn the power shelf on or off. A PMC can identify what the voltage of the power shelf is, how much power is coming out of it, if there's an individual power supply that has failed or is unhealthy, the power shelf capacity, and/or how many healthy power supplies are operational in the power shelf.

Therefore, in some embodiments the rack equipment placement and configuration 270 component, application, console, container, plugin, service, or set of micro-services, or a similar application, console, container, plugin, service, or set of micro-services, can query information from the power shelf via the PMC. It can obtain the power source telemetry 240 (e.g., power capability, power inventory, power budget, physical location) from the PMC of the power shelves (220, 222, 224, 226) as inputs 240, for example. Effective power shelf capacity can be determined by the sum of the capacities from each healthy PSU in a power shelf. The capability of each power shelf can be identified to provide power to the rack. In addition, the rack equipment placement and configuration 270 component, application, console, container, plugin, service, or set of micro-services can query information about the busbar's options and capabilities.

In addition, the rack equipment placement and configuration 270 component, application, console, container, plugin, service, or set of micro-services can query information from the ECs/BMCs of the nodes (230, 232, 234, 236, 238). It can obtain power telemetry 245 (e.g., power inventory, current power consumption, potential power consumption, Turbo Power, Thermal Design Power ("TDP"), node power inventory lower boundary ("NLB"), physical location, requirements, and/or operating conditions) as inputs 245 from the nodes, for example. The NLB can be, for example, the power that a node requires when it is fully throttled.

Then the rack equipment placement and configuration 270 component, application, console, container, plugin, service, or set of micro-services can make decisions based on such information. The rack equipment placement and configuration 270 can calculate and report the current density across every RU or OU of the busbar, in some embodiments. It can provide metrics such as maximum current density, in some embodiments. It can identify if any limits are exceeded (including Redundancy), in some embodiments. It can determine electrical current and power outputs of each power shelf, in some embodiments.

Therefore, some embodiments of the systems and methods for equipment placement and configuration in a server rack provide for a component, application, console, container, plugin, service, or set of micro-services that has a construct of a rack, the populated nodes of the rack, and disaggregated power shelves of the rack. Some embodiments employ a telemetry cycle via network access to the node ECs/BMCs and power shelf PMCs. In some embodiments, the telemetry cycle includes power inventory and consumption from each node and the power delivery capability from each power shelf.

Figure 3:
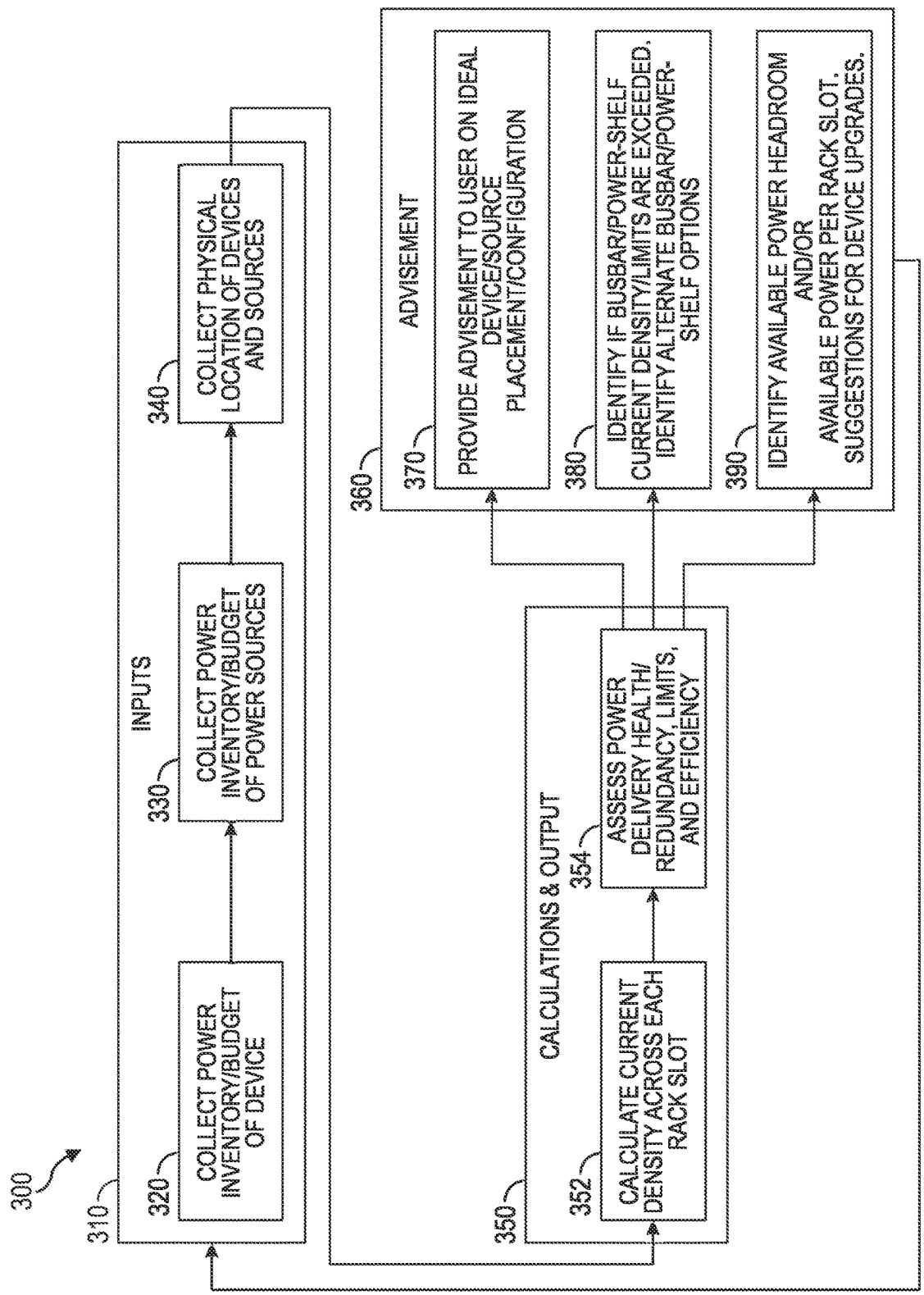
FIG. 3 is a high-level flowchart illustrating an example workflow for equipment placement and configuration in a server rack, according to some embodiments.

FIG. 3 is a high-level flowchart illustrating an example workflow 300 for equipment placement and configuration in a server rack, according to some embodiments. In some embodiments, the workflow 300 may be performed, at least in part, by operation of systems through the execution of program instructions stored in system memory 103 and executed by host processor(s) 101 of IHS 100.

The flowchart begins at 310 where a component, application, console, container, plugin, service, or set of micro-services (e.g., the rack equipment placement and configuration 270), receives inputs. First, power inventory and/or budget can be collected from a device or node 320. This information can be part of a collected power telemetry, in some embodiments. Then the flowchart transitions to 330 where power inventory and/or budget is collected from power sources. This information can be part of a collected power source telemetry, in some embodiments. Then the flowchart transitions to block 340 where the physical location of devices and sources is collected.

The flowchart then transitions from the inputs stage 310 to the calculations and outputs stage 350. In the calculations and outputs stage 350, the flowchart first calculates current density across each rack slot 352. The current density can be calculated for the busbar, for example, and can be calculated for the busbar across each rack slot, as another example. Then the flowchart transitions to block 354 which assesses power delivery health, power delivery redundancy, power delivery limits, and power delivery efficiency.

The flowchart then transitions from the calculations and outputs stage 350 to the advisement stage 360. As a first part of the advisement stage, the flowchart provides advisement to a customer, client, user, administrator, or owner on ideal device or source placement and/or configuration 370, according to some embodiments. In some embodiments, a given configuration of IT equipment and power shelves can be input (e.g., a configuration provided by a customer, client, user, administrator, or owner), and guidance can be provided regarding which devices should be populated in which rack OU slots. In some embodiments, guidance can be provided which (1) minimizes maximum busbar current density; (2) normalizes current load between power shelves; and/or (3) configures power. Such functionality can be called Rack OU Location Optimization Slots (ROLOS), in some embodiments.

As a second part of the advisement stage, the flowchart can identify if busbar and/or power shelf current density/limits are exceeded 380, and can identify alternate busbar and/or power shelf options, according to some embodiments. With regard to busbar advisor functionality, the component, application, console, container, plugin, service, or set of micro-services can identify if the busbar current density, or any other busbar limits, are exceeded. In addition, it can be determined if there is an alternate type of busbar that would be sufficient for the design (e.g., rack), and such a busbar can be identified, in some embodiments. For example, assume that a customer, client, user, administrator, or owner starts with 600A busbar, but given the guidance for optimal placement to more evenly distribute the current density, a 375A busbar is sufficient.

Similarly, with regard to power shelf advisor functionality, the component, application, console, container, plugin, service, or set of micro-services can identify if any power shelf current limits, or any other limits, are exceeded. In addition, it can be determined if there are any alternate power shelf options that are sufficient for the design (e.g., rack), and such alternate power shelf options can be identified, in some embodiments. For example, assume that a customer, client, user, administrator, or owner starts with a 25 kW 5+1 power shelf. The power shelf advisor functionality might determine that an 18 kW 6+0 power shelf will meet the needs of the customer, client, user, administrator, or owner, instead. The power shelf advisor functionality can provide X # of Power Shelves, Y(W) PSU Capability, and/or Z(N+M) Redundancy, in some embodiments.

As a third part of the advisement stage, the flowchart can identify available power headroom and/or available power per rack-slot, and potentially provide suggestions for device upgrades 390. Such functionality can be termed a power headroom advisor, in some embodiments. The power headroom advisor can identify how much power headroom is available (e.g., in a rack). It then can determine available power (e.g., in Watts) per empty rack OU slot (if there is any). It then can determine available power to upgrade existing devices. The power headroom advisor can also, for example, provide suggestions for device upgrades, increasing CPU TDP across the solution, or upgrading DIMM capacity or technology, depending on the embodiment.

One or all of the first, second, or third parts of the advisement stage can be performed, for example, by Artificial Intelligence (AI) or Machine Learning (ML) operations, in some embodiments. In such embodiments, the rack equipment placement and configuration 270 component, application, console, container, plugin, service, or set of micro-services, or a similar component, application, console, container, plugin, service, or set of micro-services, can make use of a high-performance AI device such as a Neural Processing Unit (NPU), a Tensor Processing Unit (TSU), a Neural Network Processor (NNP), or an Intelligence Processing Unit (IPU), which may be designed specifically for AI/ML, which speeds up the processing of AI/ML tasks. In various embodiments, the advisement stage 360 may be configured to execute one or more AI/ML model(s). Such AI/ML model(s) may implement: a neural network (e.g., artificial neural network, deep neural network, convolutional neural network, recurrent neural network, autoencoders, reinforcement learning, etc.), fuzzy logic, deep learning, deep structured learning hierarchical learning, Support Vector Machine (SVM) (e.g., linear SVM, nonlinear SVM, SVM regression, etc.), decision tree learning (e.g., classification and regression tree or "CART"), Very Fast Decision Tree (VFDT), ensemble methods (e.g., ensemble learning, Random Forests, Bagging and Pasting, Patches and Subspaces, Boosting, Stacking, etc.), dimensionality reduction (e.g., Projection, Manifold Learning, Principal Components Analysis, etc.), or the like.

Non-limiting examples of available AI/ML algorithms, models, software, and libraries that may be utilized within embodiments of systems and methods described herein include, but are not limited to: PYTHON, OPENCV, INCEPTION, THEANO, TORCH, PYTORCH, PYLEARN2, NUMPY, BLOCKS, TENSORFLOW, MXNET, CAFFE, LASAGNE, KERAS, CHAINER, MATLAB Deep Learning, CNTK, MatConvNet (a MATLAB toolbox implementing convolutional neural networks for computer vision applications), DeepLearnToolbox (a Matlab toolbox for Deep Learning from Rasmus Berg Palm), BigDL, Cuda-Convnet (a fast C++/CUDA implementation of convolutional or feed-forward neural networks), Deep Belief Networks, RNNLM, RNNLIB-RNNLIB, matrbm, deeplearning4j, Eblearn.lsh, deepmat, MShadow, Matplotlib, SciPy, CXXNET, Nengo-Nengo, Eblearn, cudamat, Gnumpy, 3-way factored RBM and mcRBM, mPOT, ConvNet, ELEKTRONN, OpenNN, NEURALDESIGNER, Theano Generalized Hebbian Learning, Apache SINGA, Lightnet, and SimpleDNN.

Therefore, some embodiments of the systems and methods for equipment placement and configuration in a server rack can provide utilization of a deployment power budget, and power delivery attributes, across devices in a busbar-equipped rack, in order to calculate current density, consumption, and production across the devices. Some embodiments can use the calculations to provide unique guidance regarding slot placement of devices in the rack, in order to achieve optimum current distribution across the devices. Some of these embodiments can provide clear guidance to customers, clients, users, administrators, or owners about how to populate a rack of IT equipment and power shelves. Some embodiments use AI/ML techniques to perform these tasks.

Some embodiments also provide a method of calculating current density cross-sections in a busbar-equipped rack, given the power budget of IT devices and capabilities of power shelves. In addition, some embodiments utilize power budget, busbar material characteristics, and/or mapped position of IT equipment, to identify if any material or component limits are exceeded. Some embodiments provide a method to identify an optimal map of components, in order to mitigate other limit excursions.

Some embodiments can also provide a validation mechanism, when configuring a rack scale-out solution, that the busbar, power shelf, and IT device configurations fit within the power envelope and power infrastructure of the deployment. Some embodiments can identify that all devices are operating within their safety parameters and limits, for example.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). This may include selecting predefined logic blocks and logically associating them. It may also include programming computer software-based logic of a retrofit control device, wiring discrete hardware components, or a combination of thereof. Such configured devices are physically designed to perform the specified operation(s).

Various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising that comprises:
   a processor; and
   a memory coupled to the processor, wherein the memory comprises program instructions stored thereon that, upon execution by the processor, cause the IHS to perform operations that comprise:
      obtain power telemetry from a plurality of nodes of a server rack;
      obtain power source telemetry from one or more power sources of the server rack, wherein the one or more power sources comprise one or more power shelves, and wherein the one or more power shelves comprise one or more power supplies; and
      determine, based at least in part on the power telemetry and the power source telemetry, a placement or configuration for at least some of the nodes or power sources of the server rack.

2. The IHS of claim 1, wherein the program instructions further cause the IHS to:
   provide the placement or configuration determination to a user, administrator, or owner of the server rack.

3. The IHS of claim 1, wherein the server rack comprises a plurality of slots and a busbar, and wherein the program instructions further cause the IHS to:
   obtain physical locations from the plurality of nodes and the one or more power sources of the server rack; and
   determine, based at least in part on the physical locations, the power telemetry, and the power source telemetry, a current density of the busbar across each of the plurality of slots of the server rack;
   wherein to determine the placement or configuration for the at least some of the nodes or power sources, the program instructions further cause the IHS to:

determine, based at least in part on the current density of the busbar, the placement or configuration for the at least some of the nodes or power sources of the server rack.

4. The IHS of claim 1, wherein the server rack comprises a plurality of slots, and wherein to determine the placement or configuration for the at least some of the nodes or power sources, the program instructions further cause the IHS to:
determine, for individual slots of the plurality of slots of the server rack, the placement of the at least some of the nodes and the power sources within the individual slots.

5. The IHS of claim 4, wherein the server rack comprises a busbar, and wherein to determine the placement of the at least some of the nodes and the power sources within the individual slots, the program instructions further cause the IHS to:
determine a maximum current density of the busbar across at least some of the individual slots of the server rack; and
determine the placement of the at least some of the nodes and the power sources within the individual slots to minimize the maximum busbar current density.

6. The IHS of claim 1, wherein the server rack comprises a busbar, and wherein to determine the placement or configuration for the at least some of the nodes or power sources, the program instructions further cause the IHS to:
determine a current density of the busbar;
determine that the current density of the busbar exceeds a threshold; and
identify alternative busbars for the server rack.

7. The IHS of claim 1, wherein to determine the placement or configuration for the at least some of the nodes or power sources, the program instructions further cause the IHS to:
determine that a current limit of a power source is exceeded; and
identify alternative power sources for the server rack.

8. The IHS of claim 1, wherein to determine the placement or configuration for the at least some of the nodes or power sources, the program instructions further cause the IHS to:
determine, based at least in part on the power source telemetry, that additional power is available in the server rack; and
responsive to the determination that additional power is available, identify one or more upgrades to one or more nodes of the server rack.

9. The IHS of claim 1, wherein the power telemetry comprises at least one of: power inventory of the plurality of nodes, power consumption of the plurality of nodes, turbo power of the plurality of nodes, thermal design power of the plurality of nodes, a power inventory lower boundary of the plurality of nodes, or physical locations of the plurality of nodes.

10. The IHS of claim 1, wherein the placement or configuration for the at least some of the nodes or power sources of the server rack is determined by a machine learning model.

11. The IHS of claim 1, wherein the power source telemetry comprises at least one of: power capacity of the one or more power sources, power capability of the one or more power sources, power inventory of the one or more power sources, or one or more physical locations of the one or more power sources.

12. The IHS of claim 1, wherein the power telemetry and the power source telemetry is obtained via a network.

13. The IHS of claim 1, wherein the power telemetry further comprises power required by each node when fully throttled.

14. The IHS of claim 1, wherein the one or more power shelves comprise one or more disaggregated power shelves.

15. A method, comprising:
obtaining power telemetry from a plurality of nodes of a server rack;
obtaining power source telemetry from one or more power sources of the server rack, wherein the one or more power sources comprise one or more power shelves, and wherein the one or more power shelves comprise one or more power supplies; and
determining, based at least in part on the power telemetry and the power source telemetry, a placement or configuration for at least some of the nodes or power sources of the server rack.

16. The method of claim 15, further comprising:
providing the placement or configuration determination to a user, administrator, or owner of the server rack.

17. The method of claim 15, wherein the server rack further comprises a plurality of slots and a busbar, and wherein the method further comprises:
obtaining physical locations from the plurality of nodes and the one or more power sources of the server rack; and
determining, based at least in part on the physical locations, the power telemetry, and the power source telemetry, a current density of the busbar across each of the plurality of slots of the server rack;
wherein determining the placement or configuration for the at least some of the nodes or power sources further comprises:
determining, based at least in part on the current density of the busbar, the placement or configuration for the at least some of the nodes or power sources of the server rack.

18. The method of claim 15, wherein the server rack further comprises a plurality of slots and a busbar, and wherein determining the placement or configuration for the at least some of the nodes or power sources further comprises:
determining, based at least in part on the power source telemetry, a maximum current density of the busbar across at least some of the plurality of slots of the server rack; and
determining, for individual slots of the plurality of slots of the server rack, the placement of the at least some of the nodes and the power sources within the individual slots that minimizes the maximum busbar current density.

19. One or more non-transitory computer-readable storage media that comprise stored program instructions that when executed on or across one or more processors of an Information Handling System (IHS), cause the one or more processors to:
obtain power telemetry from a plurality of nodes of a server rack;
obtain power source telemetry from one or more power sources of the server rack, wherein the one or more power sources comprise one or more power shelves, and wherein the one or more power shelves comprise one or more power supplies; and
determine, based at least in part on the power telemetry and the power source telemetry, a placement or configuration for at least some of the nodes or power sources of the server rack.

20. The one or more non-transitory computer-readable storage media of claim 19, wherein the server rack comprises a plurality of slots and a busbar, and wherein the program instructions further cause the one or more processors to:
- obtain physical locations from the plurality of nodes and the one or more power sources of the server rack; and
- determine, based at least in part on the physical locations, the power telemetry, and the power source telemetry, a current density of the busbar across each of the plurality of slots of the server rack;
- wherein to determine the placement or configuration for the at least some of the nodes or power sources, the program instructions further cause the one or more processors to:
  - determine, based at least in part on the current density of the busbar, the placement or configuration for the at least some of the nodes or power sources of the server rack.

\* \* \* \* \*